(12) United States Patent
Wang et al.

(10) Patent No.: US 10,936,117 B2
(45) Date of Patent: Mar. 2, 2021

(54) TOUCH DISPLAY PANEL AND DRIVING METHOD THEREOF

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Zhangmeng Wang, Beijing (CN); Xianjie Shao, Beijing (CN); Yimin Chen, Beijing (CN)

(73) Assignees: HEFEI BOE OPTOELECTRONICS TECHNOLOGY CO., LTD., Hefei (CN); BOE TECHNOLOGY GROUP CO.. LTD., Beijing (CN)

( * ) Notice: Subject to any disclaimer, the term of this patent is extended or adjusted under 35 U.S.C. 154(b) by 0 days.

(21) Appl. No.: 16/472,832

(22) PCT Filed: May 15, 2018

(86) PCT No.: PCT/CN2018/086908
§ 371 (c)(1),
(2) Date: Jun. 21, 2019

(87) PCT Pub. No.: WO2018/219142
PCT Pub. Date: Dec. 6, 2018

(65) Prior Publication Data
US 2019/0332241 A1 Oct. 31, 2019

(30) Foreign Application Priority Data
May 31, 2017 (CN) .......................... 201710401324.X

(51) Int. Cl.
*G06F 3/041* (2006.01)

(52) U.S. Cl.
CPC ........ *G06F 3/04164* (2019.05); *G06F 3/0412* (2013.01); *G06F 3/0418* (2013.01); *G06F 3/04166* (2019.05); *G06F 3/04184* (2019.05)

(58) Field of Classification Search
None
See application file for complete search history.

(56) References Cited

U.S. PATENT DOCUMENTS 9,069,409 B2   6/2015  Chang
9,638,949 B1 * 5/2017  Kim .................... G02F 1/13338
(Continued)

FOREIGN PATENT DOCUMENTS

CN   102841718 A   12/2012
CN   103793118 A    5/2014
(Continued)

OTHER PUBLICATIONS

International Search Report and Written Opinion issued in corresponding International Application No. PCT/CN2018/086908, dated Aug. 21, 2018, with English translation.
(Continued)

*Primary Examiner* — Christopher R Lamb
(74) *Attorney, Agent, or Firm* — McDermott Will and Emery LLP

(57) ABSTRACT

A touch display panel includes: a plurality of electrode blocks arranged in an array and spaced apart in an active area; an inner common electrode line surrounding the active area and disposed in a non-active area, a spacing area being provided between the active area and a portion of the inner common electrode line located away from a side where a driving circuit area is located; a plurality of dummy touch driving electrode lines arranged in parallel and running through the active area, the plurality of dummy touch driving electrode lines arranged in parallel being in one-to-
(Continued)

one correspondence with and electrically connected to at least electrode blocks close to the spacing area; and switch circuits disposed in the spacing area that are in one-to-one correspondence with the electrode blocks electrically connected to the dummy touch driving electrode lines.

10 Claims, 4 Drawing Sheets

(56) References Cited

U.S. PATENT DOCUMENTS

| | | | |
|---|---|---|---|
| 2009/0102824 A1* | 4/2009 | Tanaka | G09G 3/3648 345/205 |
| 2014/0118277 A1 | 5/2014 | Kim et al. | |
| 2014/0132534 A1* | 5/2014 | Kim | G06F 3/0416 345/173 |
| 2017/0038886 A1 | 2/2017 | Zheng et al. | |
| 2017/0336898 A1* | 11/2017 | Maede | G06F 3/044 |
| 2018/0203541 A1 | 7/2018 | Liu et al. | |
| 2018/0217701 A1 | 8/2018 | Jin | |
| 2019/0332241 A1 | 10/2019 | Wang et al. | |

FOREIGN PATENT DOCUMENTS

| | | |
|---|---|---|
| CN | 104714695 A | 6/2015 |
| CN | 104820514 A | 8/2015 |
| CN | 105808014 A | 7/2016 |
| CN | 205899211 U | 1/2017 |
| CN | 106406611 A | 2/2017 |
| CN | 107122081 A | 9/2017 |
| KR | 10-2016-0072646 A | 6/2016 |

OTHER PUBLICATIONS

First Office Action issued in Chinese Application No. 201710401324. X, dated Feb. 27, 2019, with English translation.
Second Office Action issued in Chinese Application No. 201710401324. X, dated Jul. 4, 2019, with English translation.
Rejection Decision issued in Chinese Application No. 201710401324. X, dated Dec. 3, 2019, with English translation.

* cited by examiner

TOUCH DISPLAY PANEL AND DRIVING METHOD THEREOF

CROSS-REFERENCE TO RELATED APPLICATION

This application is a national phase entry under 35 USC 371 of International Patent Application No. PCT/CN2018/086908 filed on May 15, 2018, which claims priority to Chinese Patent Application No. 201710401324.X, filed on May 31, 2017 with the Chinese Patent Office, titled "A TOUCH DISPLAY PANEL AND DRIVING METHOD THEREOF", which are incorporated herein by reference in their entirety.

TECHNICAL FIELD

The present disclosure relates to the field of display technologies, and in particular, to a touch display panel and a driving method thereof.

BACKGROUND

With the development of display technologies, touch and display driver integration (TDDI) is becoming more and more mainstream. TDDI technology is continuously being used in products of various sizes and resolutions. Therefore, ensuring normal display and touch functions becomes the key to TDDI technology.

SUMMARY

In an aspect, a touch display panel is provided, which is divided into an active area, a non-active area surrounding the active area, and a driving circuit area located on a side of the non-active area. The touch display panel includes: a plurality of electrode blocks arranged in an array and spaced apart in the active area; an inner common electrode line surrounding the active area and disposed in the non-active area, a spacing area being provided between the active area and a portion of the inner common electrode line that is located away from a side where the driving circuit area is located; a plurality of dummy touch driving electrode lines arranged in parallel and running through the active area, the plurality of dummy touch driving electrode lines arranged in parallel being in one-to-one correspondence with at least electrode blocks close to the spacing area in the plurality of electrode blocks, and each dummy touch driving electrode line being electrically connected to a corresponding one of the plurality of electrode blocks; and switch circuits disposed in the spacing area that are in one-to-one correspondence with the electrode blocks electrically connected to the dummy touch driving electrode lines, the switch circuits being used for electrically connecting the inner common electrode line to the dummy touch driving electrode lines.

In some embodiments of the present disclosure, the plurality of dummy touch driving electrode lines arranged in parallel are arranged in a column direction; and electrode blocks in one-to-one correspondence with and electrically connected to the plurality of dummy touch driving electrode lines arranged in parallel include at least a first row of electrode blocks close to the spacing area.

In some embodiments of the present disclosure, a number of the plurality of dummy touch driving electrode lines arranged in parallel is less than a number of the plurality of electrode blocks; and the plurality of dummy touch driving electrode lines arranged in parallel are in one-to-one correspondence with the first row of electrode blocks close to the spacing area, and are electrically connected to the first row of electrode blocks close to the spacing area respectively.

In some embodiments of the present disclosure, each switch circuit includes an input end and an output end, and the input end is electrically connected to the inner common electrode line. One end of any dummy touch driving electrode line electrically connected to an electrode block is electrically connected to an output end of a corresponding switch circuit, and another end of the dummy touch driving electrode line is left unconnected.

In some embodiments of the present disclosure, each switch circuit further includes a control terminal; and the touch display panel further includes an integrated circuit disposed in the driving circuit area, wherein the integrated circuit is used for controlling the control terminal of the switch circuit.

In some embodiments of the present disclosure, the touch display panel further includes a plurality of touch driving electrode lines arranged in parallel and running through the active area; and one end of each of the plurality of touch driving electrode lines arranged in parallel is electrically connected to a corresponding the electrode block, and another end is electrically connected to the integrated circuit.

In some embodiments of the present disclosure, the touch display panel further includes a flexible printed circuit board electrically connected to the integrated circuit.

In another aspect, a driving method of the touch display panel is provided. The driving method includes: in a display period, controlling the switch circuits to be turned on, so that an electrical signal on the inner common electrode line is transmitted through the switch circuits to corresponding electrode blocks; and in a touch period, controlling the switch circuits to be turned off, so as to disconnect the inner common electrode line from the electrode blocks.

In some embodiments of the present disclosure, the driving method further includes: in the display period, inputting normal display signals to the touch display panel; and in the touch period, inputting a touch signal to the touch display panel.

In some embodiments of the present disclosure, in an inter-frame driving mode, a time of a single period is composed of a single display period and a single touch period.

In some embodiments of the present disclosure, in an intra-frame driving mode, a time of a single frame is composed of display periods and touch periods interspersed among the display periods; and the driving method includes: step 1, equally dividing a touch signal into m signals, wherein m is equal to or greater than 2; step 2, in an i-th display period of a frame, inputting display signals and turning on the switch circuits, so as to display an i-th portion of the frame and cause an electrical signal on the inner common electrode line to be transmitted through the switch circuits to corresponding electrode blocks; step 3, in an i-th touch period immediately after the i-th display period of the frame, inputting an i-th signal divided from the touch signal and controlling the switch circuits to be turned off, so as to disconnect the inner common electrode line from the electrode blocks; and sequentially repeating step 2 and step 3 until all portions of the frame are displayed, wherein i is set to a value from 1 to m in order.

DETAILED DESCRIPTION

The technical solutions in embodiments of the present disclosure will be described clearly and completely with reference to the accompanying drawings in embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

It will be noted that, unless otherwise defined, all terms (including technical and scientific terms) used in embodiments of the present disclosure have the same meaning as commonly understood by a person of ordinary skill in the art. It will also be understood that terms such as those defined in an ordinary dictionary should be interpreted as having meanings consistent with their meanings in the context of the related art, and should not interpreted in an idealized or extremely formalized way unless explicitly defined herein.

For example, terms used in the description and claims of the present disclosure such as "include" or "comprise" are intended to mean that an element or object preceding the word encompasses an element or object listed after the word and equivalents thereof, and does not exclude other elements or objects. Orientations or positional relationships indicated by terms such as "a side/an end" and "another side/another end" are based on orientations or positional relationships shown in the accompanying drawings, and are merely simplified descriptions for convenience of explaining technical solutions of the present disclosure, but are not to indicate or imply that the referred devices or elements must have a particular orientation, or must be constructed or operated in a particular orientation. Therefore they should not be construed as limitations to the present disclosure.

Figure 1:
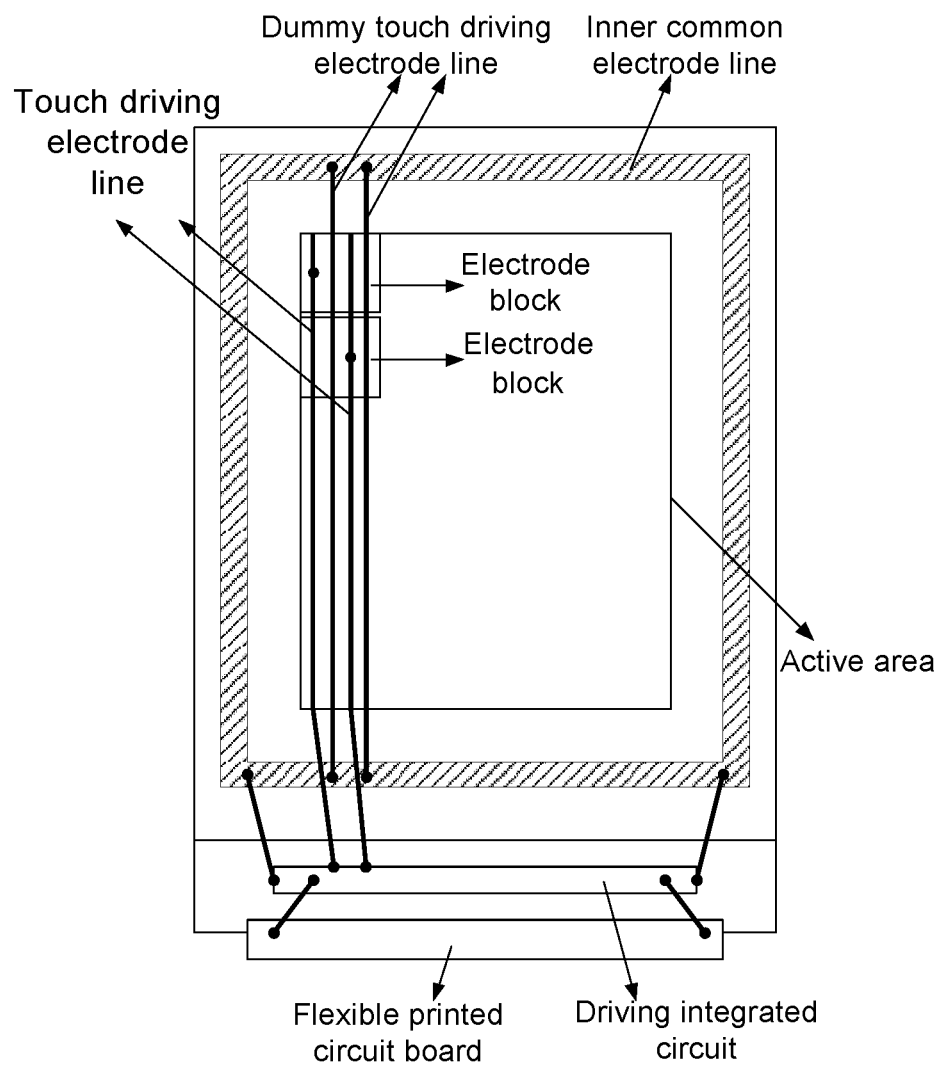
FIG. 1 is a schematic diagram showing a structure of a touch display panel, in accordance with the related art.

As shown in FIG. 1, a touch display panel adopting a touch and display driver integration (TDDI) technology uses a film layer designed for display to realize time division multiplex loading of touch panel (TP) signals. The film layer is divided into hundreds or even thousands of independent sensor (electrode) blocks, with each electrode block being supplied with electrical signals by an integrated circuit (IC) through a touch driving electrode line (Tx line). In a display period, an electrical signal is a common electrode signal (Vcom signal) to achieve normal display; and in a touch period, an electrical signal is a TP signal to achieve touch effect.

However, due to limitation of a number of pins of the IC, each electrode block can only be supplied with signals through a single Tx line. As a size of a panel continues to increase, a distance from the IC to a side of the display panel opposite to the side of the display panel where the IC is located, i.e., a distance from the IC to an electrode block on a side of the active area close to an edge of the panel, becomes longer, a resistance of the Tx line increases sharply. As a result, the Vcom signal is partially attenuated when it reaches the side opposite to the IC, and a display abnormality will occur, which affects normal display in the display phase.

Figure 2:
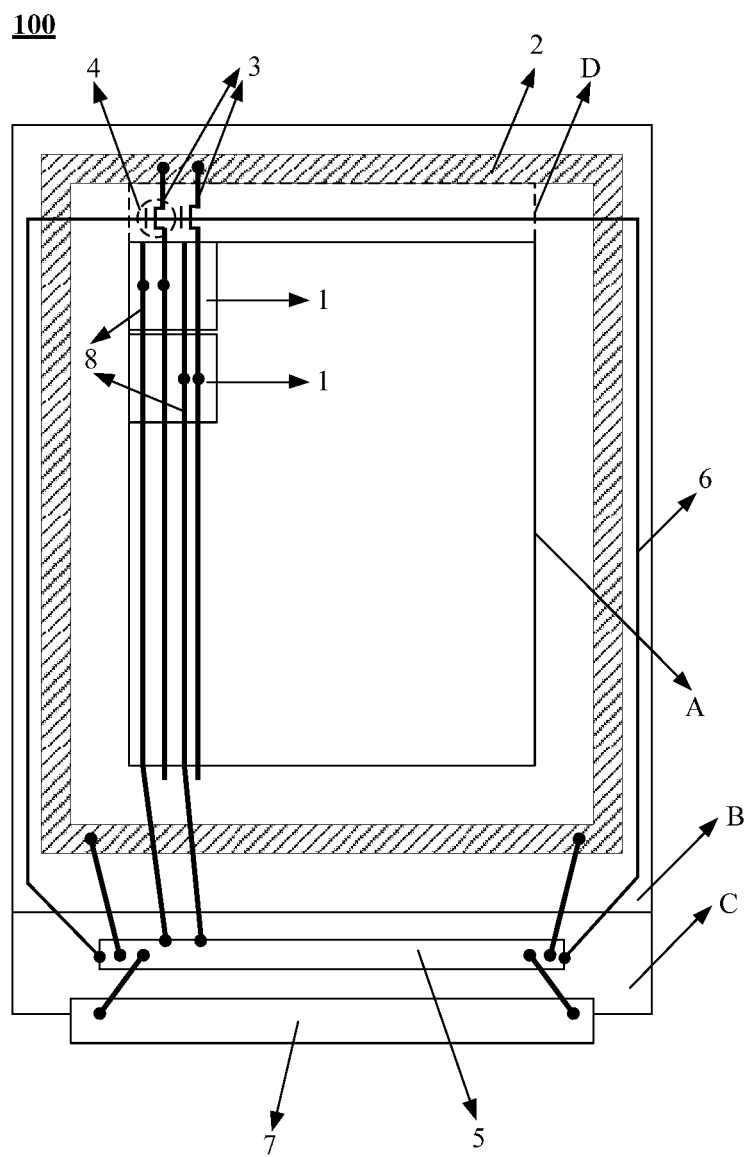
FIG. 2 is a schematic diagram showing a structure of a touch display panel, in accordance with some embodiments of the present disclosure.

As shown in FIG. 2, some embodiments of the present disclosure provide a touch display panel 100. The touch display panel is divided into an active area (marked as A in FIG. 2), a non-active area (marked as B in FIG. 2) surrounding the active area A, and a driving circuit area (marked as C in FIG. 2) located on a side of the non-active area B. The touch display panel 100 includes: a plurality of electrode blocks 1 arranged in an array and spaced apart in the active area A, and an inner common electrode line 2 surrounding the active area and disposed in the non-active area B. A spacing area (marked as D in FIG. 2) is provided between the active area A and a portion of the inner common electrode line 2 that is located away from the side where the driving circuit area C is located. The touch display panel 100 further includes: a plurality of dummy touch driving electrode lines 3 arranged in parallel and running through the active area A, the plurality of dummy touch driving electrode lines 3 arranged in parallel being in one-to-one correspondence with and electrically connected to at least electrode blocks 1 close to the spacing area D in the plurality of electrode blocks 1; and switch circuits 4 disposed in the spacing area D that are in one-to-one correspondence with electrode blocks 1 electrically connected to the dummy touch driving electrode lines 3, each switch circuit 4 being used for electrically connecting the inner common electrode line 2 to a dummy touch driving electrode line 3.

It will be noted that, first, FIG. 2 merely schematically shows structures such as the electrode blocks 1 and the dummy touch driving electrode lines 3 in the touch display panel, the numbers of the structures are not limited and can be flexibly adjusted according to a design of a display product.

Second, the inner common electrode line 2 has an annular wiring structure surrounding the active area, and may be electrically connected to the IC disposed in the driving circuit area C through leads so as to receive the Vcom signal.

Third, in order to describe the plurality of dummy touch driving electrode lines 3 arranged in parallel and running through the active area A more clearly, reference may be made to the related art shown in FIG. 1. In the related art, an electrode block electrically connected to a touch driving electrode line (Tx line) can have time division multiplex function, that is, can be used as a common electrode to receive the common electrode signal (Vcom signal) transmitted through the Tx line in the display period, and used as a touch electrode to receive the touch driving signal transmitted through the Tx line in the touch period.

Since a size of a sub-pixel unit is very small (the sub-pixel unit is usually a small square of 240 μm*240 μm), and an area of a region where a human finger touches a display screen is much larger than the size of the sub-pixel unit, a recognition accuracy of the touch does not need to reach an order of magnitude of the sub-pixel unit. Therefore, in order to simplify the process, one electrode block usually corresponds to dozens of sub-pixel units.

Since one column of sub-pixel units along a data line shares one or several Tx lines, there are a plurality of Tx lines in a region where a single electrode block is located. However, due to limitation of the number of pins of the IC, one electrode block is electrically connected to only one Tx line. As a result, some Tx lines in the touch display panel are not electrically connected to electrode blocks and become dummy touch driving electrode lines (dummy Tx lines). Both ends of the dummy Tx lines are usually electrically connected to the annular inner common electrode line mentioned above through via holes respectively. A specific number of dummy touch driving electrode lines is related to factors such as a number of Tx lines shared by a column of sub-pixel units, a resolution of the touch display panel, and a specific number of sub-pixel units corresponding to one electrode block.

Fourth, since electrode blocks 1 close to the spacing area D are located on a side in the display area A opposite to a side of the panel where the driving circuit area C is located, the electrode blocks 1 close to the spacing area D are electrically connected to a corresponding number of dummy touch driving electrode lines 3 through via holes respectively, and the touch driving electrode lines 3 electrically connected to the electrode blocks 1 are then connected to the inner common electrode line 2 through the switch circuits 4, the Vcom signals on the inner common electrode line 2 may be transmitted to the electrode blocks 1 disposed on a side opposite to the IC, so as to increase a supply of Vcom signals to the electrode blocks 1.

Based on this, the touch display panel provided in some embodiments of the present disclosure provides a new Vcom signal supply structure by adding several switch circuits on the side of the panel away from the IC. In this way, idle dummy touch driving electrode lines in the panel are fully used to supply the Vcom signals on the inner common electrode line to the electrode blocks close to the spacing area (i.e., on the side opposite to the IC) in the active area. The switch circuits may be flexibly controlled to be turned on or turned off according to a given timing, so as to increase the supply of Vcom signals in the panel in the display period and thus improve a display effect, and also to ensure a normal touch function in the touch period.

The dummy touch driving electrode lines 3 are usually arranged in a column direction, and the electrode blocks 1 in one-to-one correspondence with and electrically connected to the dummy touch driving electrode lines 3 include at least a first row of electrode blocks close to the spacing area, so that it may be ensured that the first row of electrode blocks 1 which are the farthest from the IC with the most severe signal attenuation may be supplied with Vcom signals.

A number of the dummy touch driving electrode lines 3 is usually less than a number of electrode blocks 1 in the entire panel. Therefore, the dummy touch driving electrode lines 3 only need to be in one-to-one correspondence with and electrically connected to electrode blocks 1 close to the spacing area. Since attenuation does not occur to the Vcom signals received by electrode blocks 1 close to the IC, there is no need to connect the electrode blocks 1 close to the IC to the idle dummy touch driving electrode lines 3.

Furthermore, a switch circuit 4 includes an input end and an output end. The input end is electrically connected to the inner common electrode line 2. One end of any dummy touch driving electrode line 3 electrically connected to an electrode block 1 is electrically connected to an output end of a corresponding switch circuit 4, and another end of the dummy touch driving electrode is left unconnected (i.e., is disconnected from the inner common electrode line 2 and does not receive an electrical signal). In this way, it may be ensured that when the switch circuit 4 is turned on, the Vcom signal on the inner common electrode line 2 may be transmitted to a corresponding electrode block 1 through the switch circuit 4.

The switch circuit 4 further includes a control terminal. As shown in FIG. 2, the touch display panel further includes an integrated circuit (IC) 5 disposed in the driving circuit area, and the IC is used for controlling the control terminal of the switch circuit 4.

The control terminal of each switch circuit 4 may be electrically connected to the integrated circuit 5 through a control terminal connecting wiring disposed in the non-active area, so as to control the switch circuit 4 based on time division to be turned on in the display period or turned off in the touch period.

The integrated circuit 5 may also be electrically connected to the flexible printed circuit board (FPCB) 7. The FPCB may be bent to a back side of the panel, thereby further increasing a screen-to-body ratio of the active area of the panel and optimizing the display effect.

Of course, as shown in FIG. 2, the touch display panel 100 further includes a plurality of touch driving electrode lines (Tx lines) 8 arranged in parallel and running through the active area. One end of each touch driving electrode line 8 is electrically connected to a corresponding electrode block 1, and another end is electrically connected to the integrated circuit 5.

On the basis of the above, embodiments of the present disclosure further provide a driving method of the touch display panel described above. The driving method includes:

in a display period, controlling the switch circuits to be turned on, so that an electrical signal on the inner common electrode line is transmitted through the switch circuits to corresponding electrode blocks; and in a touch period, controlling the switch circuits to be turned off, so as to disconnect the inner common electrode line from the electrode blocks.

The switch circuits may be flexibly controlled to be turned on or turned off by setting the timing, so as to increase the supply of Vcom signals in the panel in the display period and thus improve the display effect, and also to ensure the normal touch function in the touch period.

The driving method may further include: in the display period, inputting normal display signals to the touch display panel to realize a display function.

The driving method further include: in the touch period, inputting a touch signal to the touch display panel to realize a touch function.

The above step of controlling the switch circuits to be turned off may be, for example, leaving the control terminals of the switch circuits to be vacant, that is, inputting no electrical signal. However, during a display process of the panel, various electrical signals are input into corresponding structures of the panel, and a wiring layout in the panel is very compact, therefore other signals may be incorrectly transmitted to a control terminal of a switch circuit and cause the switch circuit to be turned on during the touch period and thus affect the normal touch function. Therefore, in embodiments of the present disclosure, the step of controlling the switch circuits to be turned off includes: inputting a control signal to the control terminals of the switch circuits to turn off the switch circuits.

The control signal input to the switch circuits in the touch period may, for example, has a same frequency as a gate signal input to a thin film transistor (TFT) in the active area. This control signal is not enough to turn on the switch circuits, but the signal on the control terminals of the switch circuits and other signals may be synchronously modulated, and thus reduce interference on a touch signal.

Two examples are provided below for describing in detail the specific driving method of the touch display panel in different driving modes.

Example 1: Inter-Frame Driving Mode

In the inter-frame driving mode (V_blank mode), a time of a single frame is composed of a single display period and a single touch period.

Figure 3:
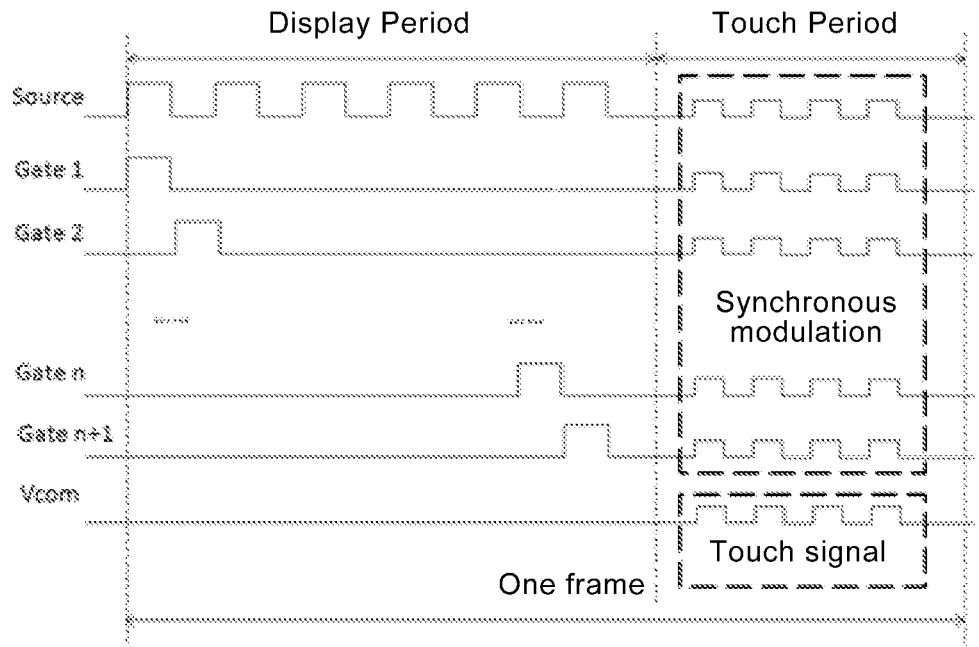
FIG. 3 is a timing control diagram of a touch display panel in a V_blank mode, in accordance with the related art.

As shown in FIG. 3, in this mode, the working principle of the touch display panel provided by the related art is as follows:

First, normal display signals are supplied, which are at same levels as display signals in a normal display panel not integrated with a touch function respectively, so as to realize the display function. That is, a source signal (marked as Source in FIG. 3) is input to data lines in the active area. Driving signals are sequentially applied to gate lines (marked as Gate 1, Gate 2, . . . , Gate n, Gate n+1 in FIG. 3), so as to turn on the TFTs connected to gate lines according to timing, and thus to turn on the sub-pixel units sequentially according to the timing. A common electrode signal (Vcom signal) is input to the electrode blocks (which are used as common electrodes at this time by a time division multiplex technology) in the active area, and the Vcom signal is usually a constant voltage of ±5 volts.

After the display period of the frame, a touch signal is applied to realize the touch function. During a time when the touch signal is applied, other signals are all synchronously modulated. After the touch period ends, a next frame begins.

Herein, synchronous modulation means to make all display signals except the touch signal have a same frequency, so as to reduce interference on the touch signal.

In this mode, a sum of a display time and a touch time is a display time of a single frame of a normal display panel, and touch point(s) are reported once in a single frame. That is, in the time of a single frame (in a case where a scanning frequency of the panel is 60 Hz, the time of a single frame is approximately 16.67 ms), the touch point(s) are identified once.

Figure 4:
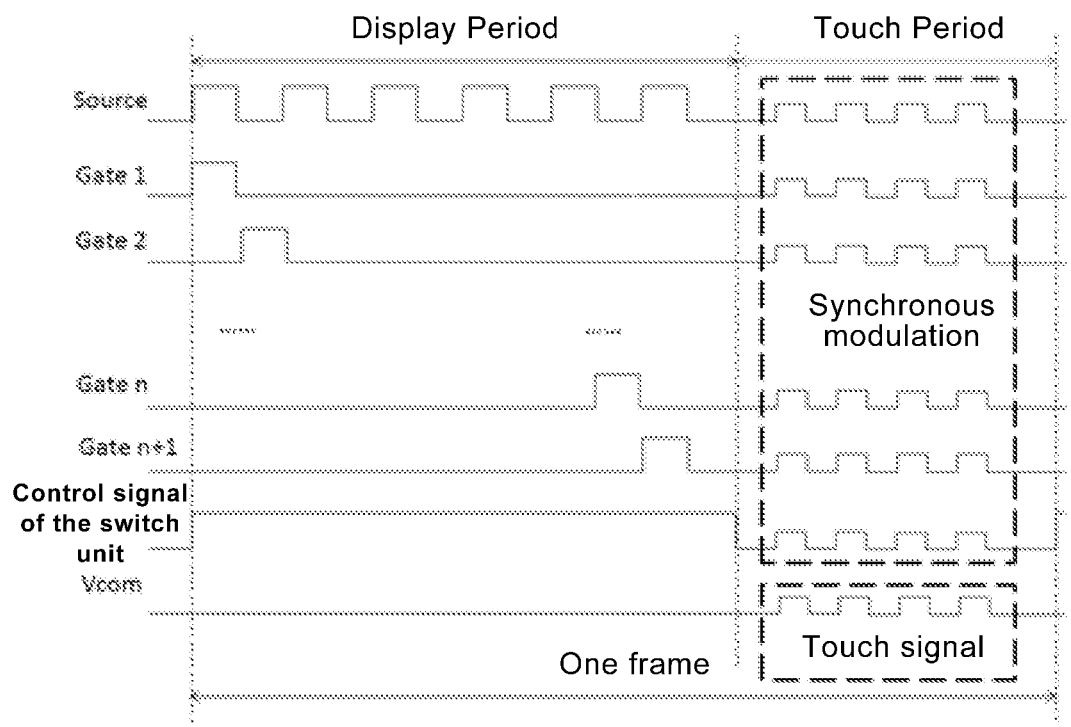
FIG. 4 is a timing control diagram of a touch display panel in a V_blank mode, in accordance with some embodiments of the present disclosure.

As shown in FIG. 4, in this mode, the working principle of the touch display panel provided by some embodiments of the present disclosure is as follows.

A control signal is input to the control terminals of the switch circuits to control on and off states of the switch circuits. In the display period, the control signal may be in a high level, so as to turn on a switch circuits such as N-type TFTs and increase the supply of Vcom signals to electrode blocks connected to the switch circuits, while other display signals are at a same level as display signals in the original structure of the related art. In the touch period, the control signal of the switch circuits such as N-type TFTs is pulled down, and the control signal and other signals have a same level, and are synchronously modulated, so as to not affect reporting of touch points.

In the touch period, a process of pulling down the control signal of the switch circuits such as TFTs is as follows. A control signal input to the control terminals of the switch circuits (such as the gates of the TFTs) has a same frequency as the gate signal input to the TFT in the active area in the touch period, so as to realize synchronous modulation of all signals except the touch signal.

Example 2: Intra-Frame Driving Mode

In the intra-frame driving mode (H_blank mode), a time of a single frame is composed of display periods and touch periods interspersed among the display periods.

Figure 5:
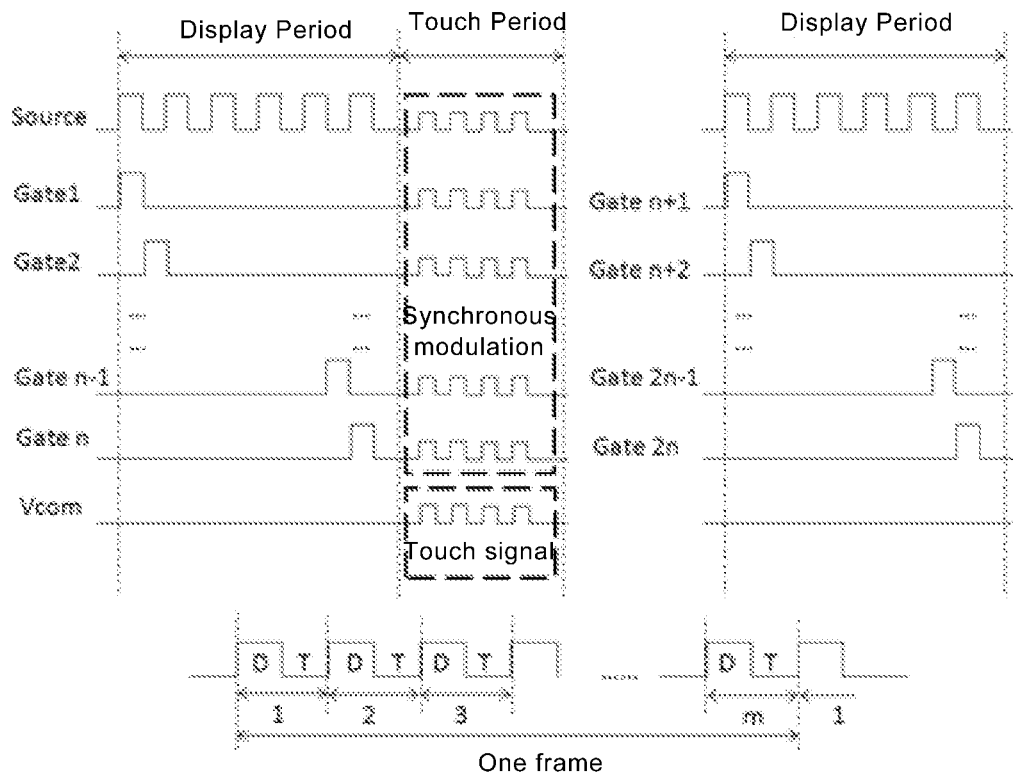
FIG. 5 is a timing control diagram of a touch display panel in an H_blank mode, in accordance with the related art.

As shown in FIG. 5, in this mode, the working principle of the touch display panel provided by the related art is as follows.

A touch signal is divided into several sub-touch signals (e.g., m signals as shown in FIG. 5), which are inserted into a display time in one frame. That is, first there is some time for display, then a sub-touch signal is inserted, then there is some time for display again, and then another sub-touch signal is inserted—this process is repeated until all sub-touch signals are inserted, and after the display time ends, the next frame begins.

In this mode, a total touch time is longer than a touch time in the inter-frame driving mode described above. However, since a total time of a single frame is the same, a display time is reduced, and touch points are reported twice in a single frame.

Figure 6:
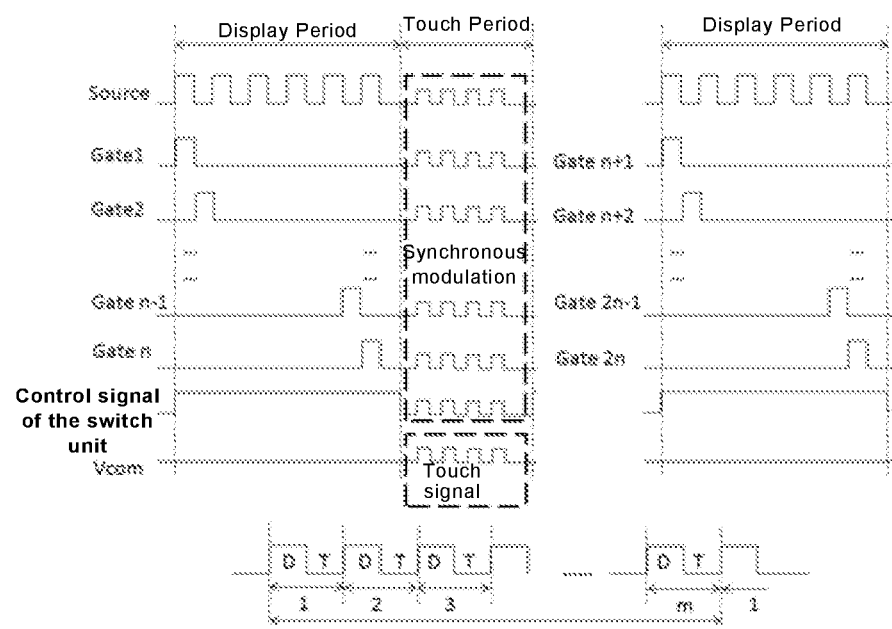
FIG. 6 is a timing control diagram of a touch display panel in an H_blank mode, in accordance with some embodiments of the present disclosure.

As shown in FIG. 6, in this mode, the working principle of the touch display panel provided by some embodiments of the present disclosure is as follows:

step 1, equally dividing a touch signal into m signals, wherein m is equal to or greater than 2 (m≥2);

step 2, in an i-th display period of a frame, inputting display signals and turning on the switch circuits (by, for example, pulling up the control signal), so as to display an i-th portion of the frame, and transmitting an electrical signal on the inner common electrode line through the switch circuits to corresponding electrode blocks, so that the supply of Vcom signals to the electrode blocks on the side of the panel away from the driving circuit area is increased;

step 3, in an i-th touch period immediately after the i-th display period of the frame, inputting an i-th signal divided from the touch signal and turning off the switch circuits (i.e., by pulling down the control signal of the switch circuits, and synchronously modulating the control signal to have a same frequency as other signals); and sequentially repeating step 2 and step 3 until all portions of the frame are displayed, wherein i is set to a value from 1 to m in order.

In this way, the supply of Vcom signals to electrode blocks on a remote end of the panel may be increased without affecting the reporting of touch points in one frame.

It will be noted that, example 1 and example 2 are both described by taking an example in which the switch circuit is an N-type TFT, which is turned on when the control signal is in a high level, and is turned off when the control signal is in a low level. In the display period, the control terminal (gate) signal is pulled up to turn on the TFT, and in the touch period, the control terminal (gate) signal is pulled down to turn off the TFT. The above examples are also applicable to a case where the switch circuit is a P-type TFT, which is turned on when the control signal is in a low level and is turned off when the control signal is in a high level. As for specific timing in this case, a timing method adopted in the related art in a case where the pixel circuit is a P-type TFT may be used.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch display panel, divided into an active area, a non-active area surrounding the active area, and a driving circuit area located on a side of the non-active area, the touch display panel comprising:
   a plurality of electrode blocks arranged in an array and spaced apart in the active area;
   an inner common electrode line surrounding the active area and disposed in the non-active area, a spacing area being provided between the active area and a portion of the inner common electrode line that is located away from a side where the driving circuit area is located;
   a plurality of dummy touch driving electrode lines arranged in parallel and running through the active area, the plurality of dummy touch driving electrode lines being in one-to-one correspondence with at least electrode blocks close to the spacing area in the plurality of electrode blocks, and each dummy touch driving electrode line being electrically connected to a corresponding one of the plurality of electrode blocks; and
   switch circuits disposed in the spacing area that are in one-to-one correspondence with the electrode blocks electrically connected to the dummy touch driving electrode lines, the switch circuits being used for electrically connecting the inner common electrode line to the dummy touch driving electrode lines; wherein
   each switch circuit includes an input end and an output end, and the input end is electrically connected to the inner common electrode line; and
   one end of any dummy touch driving electrode line electrically connected to an electrode block is electrically connected to an output end of a corresponding switch circuit, and another end of the dummy touch driving electrode line is left unconnected.

2. The touch display panel according to claim 1, wherein the plurality of dummy touch driving electrode lines arranged in parallel are arranged in a column direction; and
   electrode blocks in one-to-one correspondence with and electrically connected to the plurality of dummy touch driving electrode lines arranged in parallel include at least a first row of electrode blocks close to the spacing area.

3. The touch display panel according to claim 2, wherein a number of the plurality of dummy touch driving electrode lines arranged in parallel is less than a number of the plurality of electrode blocks; and
   the plurality of dummy touch driving electrode lines arranged in parallel are in one-to-one correspondence with the first row of electrode blocks close to the spacing area, and are electrically connected to the first row of electrode blocks close to the spacing area respectively.

4. The touch display panel according to claim 1, wherein each switch circuit further includes a control terminal; and
   the touch display panel further comprises an integrated circuit disposed in the driving circuit area, wherein the integrated circuit is used for controlling the control terminal of the switch circuit.

5. The touch display panel according to claim 4, wherein the touch display panel further comprises a plurality of touch driving electrode lines arranged in parallel and running through the active area; and
   one end of each of the plurality of touch driving electrode lines arranged in parallel is electrically connected to a corresponding electrode block, and another end is electrically connected to the integrated circuit.

6. The touch display panel according to claim 4, further comprising a flexible printed circuit board electrically connected to the integrated circuit.

7. A driving method of the touch display panel according to claim 1, the driving method comprising:
   in a display period, controlling the switch circuits to be turned on, so that an electrical signal on the inner common electrode line is transmitted through the switch circuits and the dummy touch driving electrode lines corresponding to the switch circuits to corresponding electrode blocks; and
   in a touch period, controlling the switch circuits to be turned off, so as to disconnect the inner common electrode line from the electrode blocks.

8. The driving method according to claim 7, wherein in an inter-frame driving mode, a time of a single frame is composed of a single display period and a single touch period.

9. The driving method according to claim 7, further comprising:
   in the display period, inputting normal display signals to the touch display panel; and
   in the touch period, inputting a touch signal to the touch display panel.

10. The driving method according to claim 9, wherein in an intra-frame driving mode, a time of a single frame is composed of display periods and touch periods interspersed among the display periods; and
    the driving method includes:
    step 1, equally dividing a touch signal into m signals, wherein m is equal to or greater than 2;
    step 2, in an i-th display period of a frame, inputting display signals and turning on the switch circuits, so as to display an i-th portion of the frame and cause an electrical signal on the inner common electrode line to be transmitted through the switch circuits to corresponding electrode blocks;
    step 3, in an i-th touch period immediately after the i-th display period of the frame, inputting an i-th signal divided from the touch signal and controlling the switch circuits to be turned off, so as to disconnect the inner common electrode line from the electrode blocks; and
    sequentially repeating step 2 and step 3 until all portions of the frame are displayed,
    wherein i is set to a value from 1 to m in order.

* * * * *